United States Patent
Kissel, Jr.

(10) Patent No.: US 7,906,935 B2
(45) Date of Patent: Mar. 15, 2011

(54) METHOD AND APPARATUS FOR CHARGING ELECTRIC DEVICES

(76) Inventor: Waldemar F. Kissel, Jr., Gainesville, FL (US)

(*) Notice: Subject to any disclaimer, the term of this patent is extended or adjusted under 35 U.S.C. 154(b) by 455 days.

(21) Appl. No.: 12/134,722

(22) Filed: Jun. 6, 2008

(65) Prior Publication Data

US 2009/0009131 A1      Jan. 8, 2009

Related U.S. Application Data

(60) Provisional application No. 60/942,389, filed on Jun. 6, 2007.

(51) Int. Cl.
   *H02J 7/02*    (2006.01)
   *H02J 7/00*    (2006.01)
   *B62C 11/00*   (2006.01)
   *B61C 3/00*    (2006.01)
   *B60L 9/00*    (2006.01)
   *B60K 6/00*    (2007.10)

(52) U.S. Cl. ......... 320/104; 320/116; 320/139; 307/150; 307/152; 278/36; 278/39; 278/87; 701/18; 701/22; 191/10; 180/165

(58) Field of Classification Search ............ 320/104
    See application file for complete search history.

(56) References Cited

U.S. PATENT DOCUMENTS

| | | | | |
|---|---|---|---|---|
| 3,637,956 A | | 1/1972 | Blackman | |
| 3,914,562 A | * | 10/1975 | Bolger | 191/10 |
| 4,139,071 A | * | 2/1979 | Tackett | 180/165 |
| 5,323,098 A | * | 6/1994 | Hamaguchi et al. | 320/109 |
| 5,559,420 A | * | 9/1996 | Kohchi | 180/68.5 |
| 5,669,470 A | * | 9/1997 | Ross | 191/10 |
| 5,821,728 A | * | 10/1998 | Schwind | 320/108 |

* cited by examiner

*Primary Examiner* — Edward Tso
*Assistant Examiner* — Yalkew Fantu
(74) *Attorney, Agent, or Firm* — Michael J. Colitz, III; Gray Robinson, P.A.

(57) ABSTRACT

Disclosed is a method and apparatus for charging electrically powered devices. In accordance with the invention, the device is powered by two storage devices. One storage device is capable of receiving a substantial charge very rapidly while the other storage device requires a longer time to receive a charge. The advantage is that the powered device can be used almost instantly and continually while at the same time rebuilding electrical charge.

5 Claims, 4 Drawing Sheets

METHOD AND APPARATUS FOR CHARGING ELECTRIC DEVICES

DESCRIPTION OF RELATED APPLICATIONS

This application claims benefit from provisional application Ser. No. 60/942,389 filed on Jun. 6, 2007, the contents of which are incorporated herein by reference

BACKGROUND OF THE INVENTION

1. Field of the Invention

This invention relates to a method and apparatus for charging electric devices. More particularly, the present invention relates to providing power to a vehicle via two charge carrying/storing devices, wherein one device is capable of receiving a substantial charge very rapidly while the other device requires a longer time to receive a charge, whereby power can be provided while recharging.

2. Description of the Background Art

The use of electrically powered vehicle is known in the art. For example, U.S. Pat. No. 3,637,956 to Blackman discloses an electrical automobile transportation system. The system embodies exposed electrified conductors on the road and electrical current collectors on the vehicle for contacting the road conductors. The electrified conductors supply electrical energy to the vehicle for power.

Another example is U.S. Pat. No. 3,914,562 to Bolger. Bolger discloses an electrically driven vehicle that has suitable batteries to drive the vehicle on conventional roads. The vehicle also has means for receiving power from a conductor embedded in a prepared roadway for driving the vehicle and for charging the batteries.

Another electric vehicle is disclosed in U.S. Pat. No. 4,139,071 to Tackett. Tackett discloses a roadway having a smooth road surface for vehicles and means for transmitting electric current through the road surface to electrically operated vehicles traveling thereon.

Although each of the referenced inventions achieves its own unique objective, all suffer from common drawbacks. One of these drawbacks concerns the weight of the batteries that must be carried in the vehicle. Another problem concerns the ability to quickly and efficiently charge the vehicle so as to avoid delays and/or sluggish vehicle response. Yet, another problem associated with electric powered vehicles is the cost of providing a continuous set of electrified rails along every foot of the roadway. Continuous electrified rails consume large amounts of energy and are inefficient. Moreover, the use of a continuous electrical contact rail is problematic because the vehicle can operate for only as long as it has contact with the electrified roadway. Finally, the electrical contact between the vehicle and rail in the background art is typically a brush that wears out over time or otherwise becomes a source of lost efficiency. The present invention is aimed at overcoming these deficiencies.

SUMMARY OF THE INVENTION

It is therefore one of the objects of this invention to provide an electrically powered vehicle that is powered from discrete and discontinuous electrical contacts embedded at spaced distances along a roadway.

It is another object of this invention to provide an electrically powered vehicle that is equipped with a bank of high capacity high voltage capacitors to enable the vehicle's batteries to be quickly and efficiently charged.

It is yet another object of this invention to equip an electrically powered vehicle with two charge carrying/storing devices, wherein one of the devices is capable of receiving a substantial charge very rapidly while the other device requires a longer time to receive a charge.

Still yet another object of this invention is to provide an electrically powered vehicle with a rapidly charging battery or capacitor which is secondary to a larger energy storage source.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

The present invention relates to a method and apparatus for charging electrically powered devices. In accordance with the invention, the device is powered by two storage or charge receiving devices. One of these devices is capable of receiving a substantial charge very rapidly while the other device requires a longer time to receive a charge. The advantage is that the powered device can be used almost instantly and continually while at the same time rebuilding electrical charge.

Figure 1:
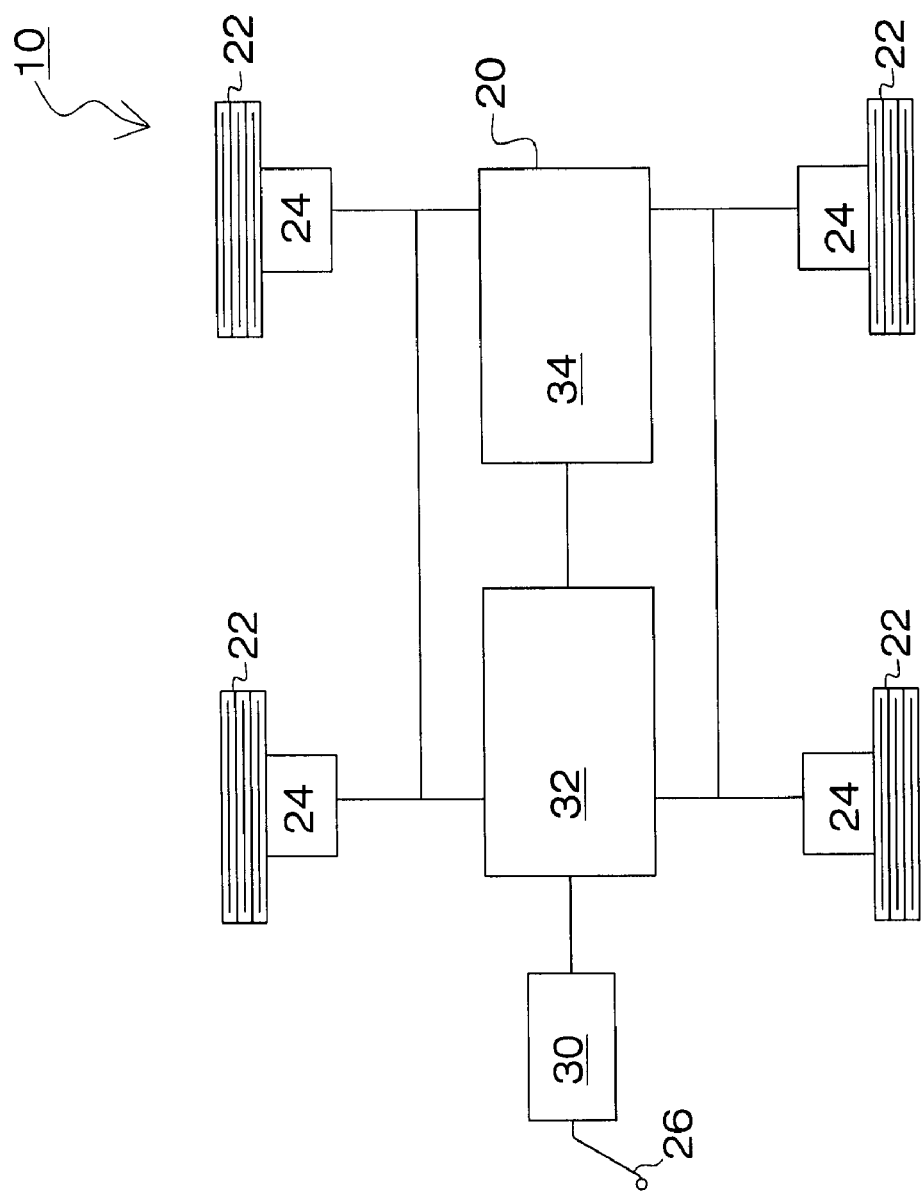
FIG. 1 is a schematic representation of a vehicle constructed in accordance with the subject invention.

FIG. 1 is a schematic diagram illustrating the various components of the system 10 of the present invention. As illustrated, the invention relates to a vehicle 20 that includes four independently operating wheels 22. In the preferred embodiment, these wheels are each powered by independent electrical motors 24. An electrical power supply, described below, routs current to each of the motors to permit the independent rotation of each wheel 22. In the alternative, one single electric motor can be used to power all four wheels.

Figure 2:
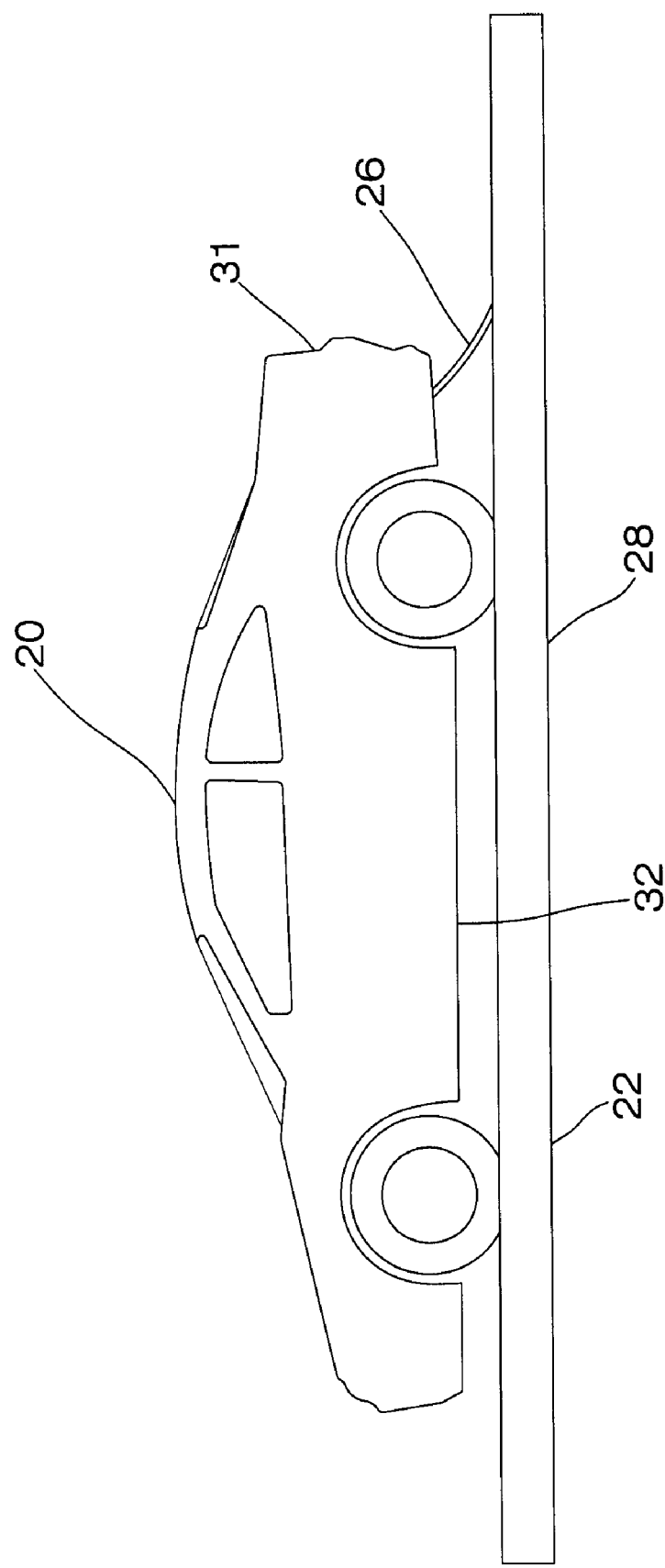
FIG. 2 is a side elevational view of a vehicle and associated roadway surface constructed in accordance with the present invention.

With continuing reference to FIG. 1, it will be seen that the vehicle 20 further includes a contact pole 26 that extends downwardly from the rear of vehicle 20. Although this is the preferred location for contact pole 26, those of ordinary skill in the art will appreciate that pole 26 can be positioned at other locations around vehicle 20. A retraction assembly 30 is also provided for raising or lowering pole 26. Assembly 30 is such that it can selectively move contact pole 26 between a first stored orientation and a second deployed orientation. In the stored orientation, pole 26 is preferably located within the body of vehicle 20. FIG. 2 illustrates contact pole 26 in its second deployed orientation. In this orientation, pole 26 preferably extends down far enough to make contact with roadway 28.

The batteries of the vehicle are described next in conjunction with FIG. 1. The vehicle is ideally supplied with one device for rapidly receiving charge 32 and one or more longer charge storage batteries 34. Devices that can be rapidly charged generally suffer from the fact that they also quickly dissipate charge and, therefore, are not ideal for prolonged electrical storage. Conversely, slower charging batteries are generally capable of storing electrical charge for prolonged periods of time but also take longer to accumulate a sufficient charge.

In one preferred embodiment, device 32 is a bank of high capacity high voltage capacitors that are capable of being fully charged in as little as 30 seconds. Those of ordinary skill in the relevant art will appreciate suitable high voltage capacitors that will suffice for this purpose. Furthermore, device 34 is any suitable storage battery. One acceptable storage battery is an advanced ultra thin organic radical polymer battery ("ORB"). Other organic polymer batteries will also suffice for this purpose. For example, U.S. Pat. No. 4,869,979 to Ohtani et. al. discloses the general construction for a organic polymer batter that may be employed in conjunction with the present invention.

Figure 3:
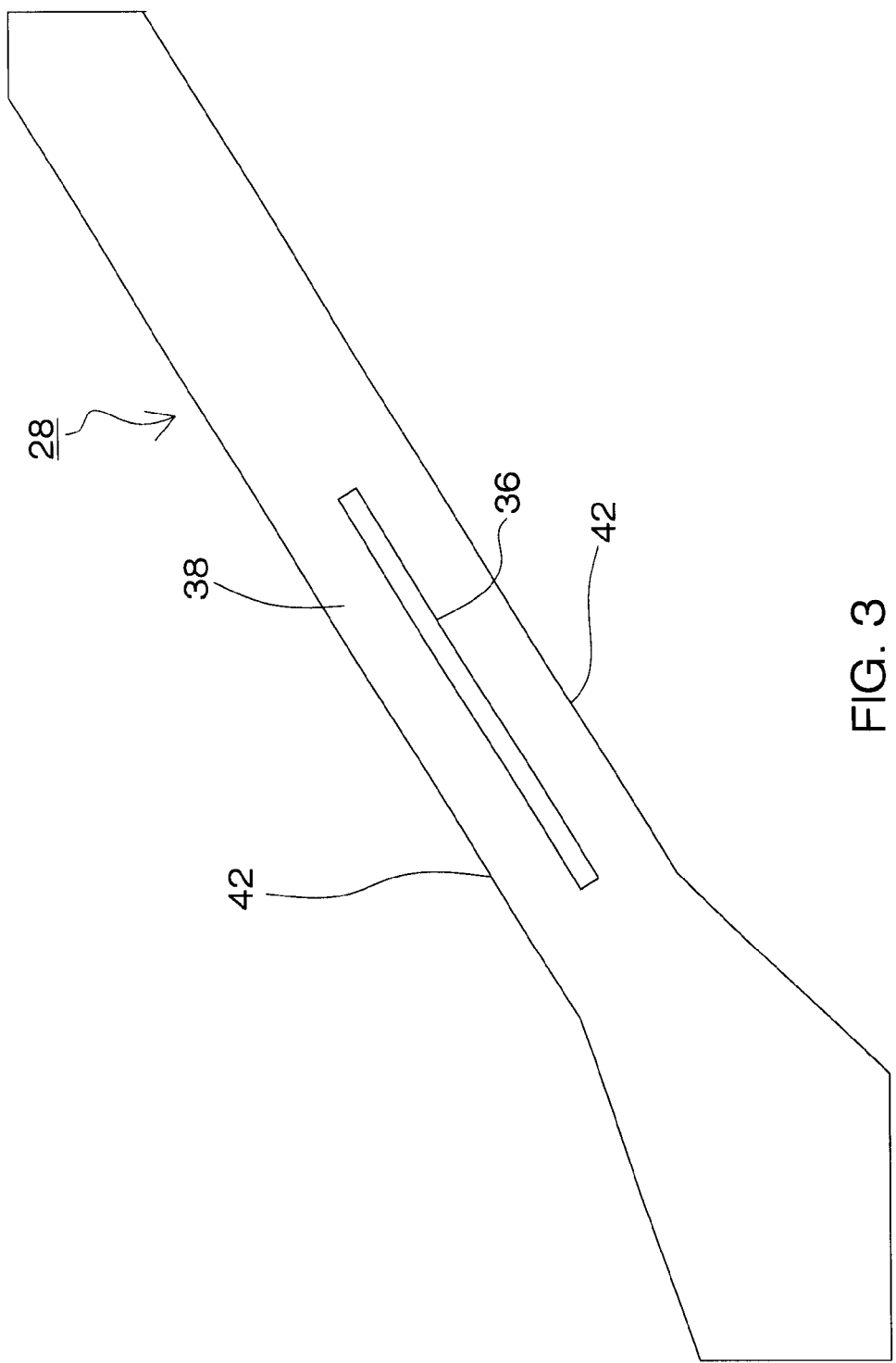
FIG. 3 is a perspective view of a roadway constructed in accordance with the present invention.

The roadway 28 forms another component of this inventive system. As illustrated in FIGS. 2 and 3, the roadway 28 includes a series of discrete and embedded electrical conductors 36 which are each positioned within corresponding slots 38. The conductors 36 are discrete in that the present invention obviates the need for a continuous electrical conductor of a substantial length. Rather, the system 10 of the present invention can be carried out with electrical strips 36 of a foot or so in length. The distance between successive conductive strips 36 is indicated by reference "D" in FIG. 4. This distance can be several feet or yards in length.

Figure 4:
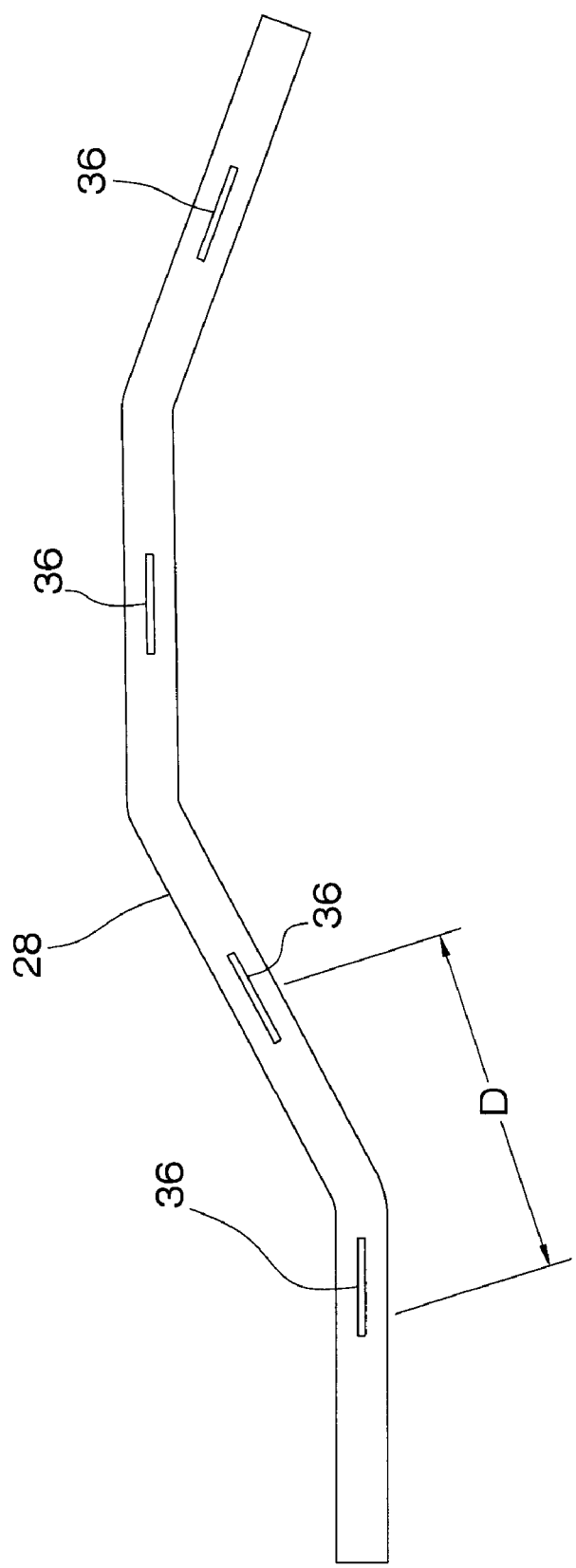
FIG. 4 is a perspective view of a roadway constructed in accordance with the present invention.

A series of several strips would constitute a single charging station. FIG. 4 is a depiction of a single charging station. The distance between successive stations could be several miles. The capacity of the storage battery 34 chosen will depend, in part, on the average distance between these charging stations.

The individuals conductors 36 that make up a charging station can be interconnected via a common ground wire for the purpose of delivering a suitable electric charge. Alternatively, each strip 36 can be interconnected to its own power source.

In use, and as shown in FIG. 2, as vehicle 20 is traveling down the road, contact pole 26 can be placed into the extended orientation by the driver. In this orientation, when the driver drives over conductors 36, contact pole 26 will dip down into slot 38. Contact pole 26 preferably includes a slight curve to bring it in contact with conductor 36. Both the high voltage capacitors 32 and the storage batteries 34 are charged during this contact. When the vehicle leaves the charging station the driver can retract the contact pole 26. During the charging process, capacitors 32 charge first. Thus, being at their higher voltage, the capacitors 32 then transfer most of their electric charge to the storage batteries 34. This transfer can occur with pole 26 in either its extended or retracted orientation. After traveling a few thousand feet or a few miles the vehicle 20 can again travel over into a charging lane as shown in FIG. 3. The design of the lane directs the vehicle into position for the contact pole 26 to again drop down into the charging trench 38. Raised lane guides 42 may be included for guiding a vehicle 20 into the charging area.

The process of charging capacitors 32, and then having the capacitors 32 charge the storage batteries 34, continues until the batteries 34 are full. As vehicle 20 moves along it will use electricity which will deplete storage batteries 34. When batteries 34 are sufficiently depleted, vehicle 20 can again enter a charging station. Here, vehicle 20 will again get re-supplied as pole 26 contact conductors 36 in the roadway 28. This contact will charge capacitors 32, which in turn, will charge the storage batteries 34.

Capacitors 32 could also be charged by another capacitors in the roadway. The onboard capacitors 32 could also be used to accelerate the vehicle 20 from stop or to a higher velocity faster than could the storage batteries 34. The vehicle 20 can operate at higher speeds thereby depleting the battery faster by knowing the battery is being recharged repeatedly without stopping. This method could also be used to reduce the number of batteries thereby reducing the cost and weight of vehicles.

Thus, the present invention is directed to a method of repeatedly recharging an electric powered vehicle without stopping by receiving a very rapid supply of electric energy from a vehicle contact with the road that thereby rapidly charges an onboard set of capacitors (or other such device such as a fuel cell). While the vehicle continues in motion, the capacitors (or other such device such as a fuel cell) charge the batteries and could also, if desired, provide electric direct to the motors until all its energy is released. Soon the vehicle is receiving another electric charge, the capacitors are filled and the batteries are charged again.

This process continues as an ongoing process. When a vehicle such as this stops then the contact pole will make contact with an electric supply provided and both the capacitor and battery are charged simultaneously while parked.

The present invention also relates to an electrified roadway that is electrified to provide electric to vehicles upon contact only on an intermittent basis. Instead of providing continuous electrified rails, overhead cables, or wires in a road bed running for miles, the electric roadway of this invention may have electric contact power supply rails, or wires ranging from a few inches or less on up to several hundred feet but with non-electrified roadbed running for thousands of feet or several miles between these electric contact power supply in the road as noted in FIG. 4. It is understood the contact and transmission of electric between roadway and vehicle could be accomplished in numerous ways.

It is understood, and it is also a claim of this invention, that an electric powered vehicle could be provided with no capacitors but have rapidly charging batteries. Presently some batteries can be fully charged in 30 seconds. This means a vehicle would be charged while in motion and the roadbed could be intermittently electrified, but the vehicle would need to remain in contact with the roadbed for a much longer time.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A system for charging electric devices comprising in combination:

a passenger vehicle having forward and rearward ends four wheels and an engine compartment, an individual electric motor associated with each of the four wheels, whereby each wheel is independently powered by the associated electric motor;

a retractable contact pole extending downwardly from the rear end of the vehicle, the contact pole having a first stored orientation and a second deployed orientation, the contact pole engaging the ground while in the second deployed orientation;

a battery of high capacity high voltage capacitors capable of quickly receiving large amounts of electrical charge and being positioned within the engine compartment, the retractable contact pole being in electrical communication with the capacitors, a storage battery capable of storing charge for a prolonged period of time positioned within the engine compartment and in electrical communication with the capacitors;

a road surface having a series of discrete and electrically charged conductors, whereby when the vehicle is traveling on the road surface the contact pole can be extended to its deployed orientation whereby the contact pole contacts the electrically charged conductors and wherein electricity from the conductors serves to rapidly charge the capacitors and further wherein when the contact pole is in its first stored orientation the capacitors serve to supply an electric charge to the storage batteries.

2. A system for charging electric devices comprising in combination:

a passenger vehicle having forward and rearward ends four wheels and an engine compartment, an electric motor for powering the four wheels;

a contact pole extending downwardly from the vehicle for engaging the ground;

a first battery capable of quickly receiving large amounts of electrical charge being positioned within the engine compartment, the contact pole being in electrical communication with the first battery, at least one second battery for the prolonged storage of charge positioned within the engine compartment and in electrical communication with the first battery;

a road surface having a series of discrete and electrically charged conductors, whereby when the vehicle is traveling on the road surface the contact pole contacts the electrically charged conductors and wherein electricity from the conductors serves to rapidly charge the first battery and further wherein when the contact pole is no longer in contact with the conductors, the first battery serves to supply an electric charge to the second battery.

3. The system as described in claim 2 wherein the first battery is a bank of high capacity high storage capacitors.

4. The system as described in claim 2 wherein the second battery is an organic polymer battery.

5. The system as described in claim 2 wherein the contact pole is selectively oriented between a first stored orientation and a second deployed orientation.

* * * * *